United States Patent [19]

Hyatt et al.

[11] 4,423,835
[45] Jan. 3, 1984

[54] METHOD OF IMPOSING A DAMAGE FREE SCORE IN A REFRACTORY PIECE

[75] Inventors: Charles J. Hyatt; James L. Oravitz, Jr., both of Cheswick, Pa.

[73] Assignee: PPG Industries, Inc., Pittsburgh, Pa.

[21] Appl. No.: 307,816

[22] Filed: Oct. 2, 1981

[51] Int. Cl.³ ............................................. C03B 33/02
[52] U.S. Cl. ......................................... 225/2; 83/880; 225/96
[58] Field of Search ........................... 225/2, 96.5, 96; 83/880, 886, 884, 887

[56] References Cited

U.S. PATENT DOCUMENTS

| | | | |
|---|---|---|---|
| 3,244,337 | 4/1966 | Curtze et al. | 225/2 |
| 3,865,293 | 2/1975 | Ernsberger et al. | 225/2 |
| 3,865,673 | 2/1975 | DeTorre | 161/1 |
| 3,979,243 | 9/1976 | DeTorre | 165/109 |
| 4,027,562 | 6/1977 | Bonaddio | 83/8 |
| 4,057,184 | 11/1977 | Michalik | 225/2 |
| 4,102,227 | 7/1978 | Simko | 83/7 |
| 4,137,803 | 2/1979 | Goldinger | 83/881 |
| 4,213,550 | 7/1980 | Bonaddio | 225/2 |

Primary Examiner—Frank T. Yost
Attorney, Agent, or Firm—William D. West; Donald C. Lepiane; Lee Patch

[57] ABSTRACT

Damage free scores are initiated in a refractory piece by advancing a pattern of grit material on the surface of the refractory piece under a properly biased scoring wheel. The grit material is preferably harder than the surface of the refractory piece but not as hard as the scoring surface of the scoring wheel.

11 Claims, 3 Drawing Figures

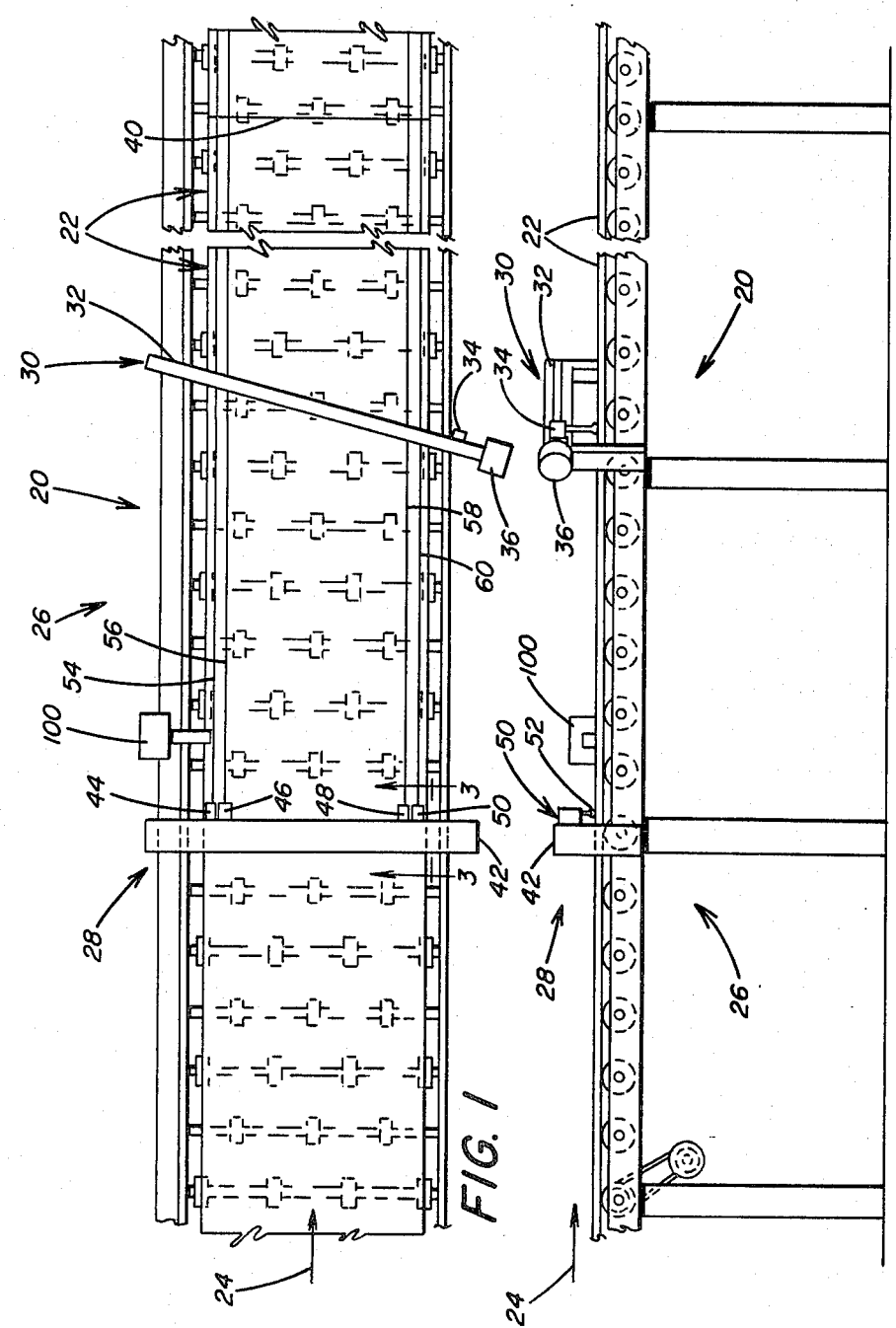

METHOD OF IMPOSING A DAMAGE FREE SCORE IN A REFRACTORY PIECE

FIELD OF THE INVENTION

This invention relates to scoring a refractory piece and more particularly, to initiating a damage-free score in a moving ribbon of glass.

DISCUSSION OF THE TECHNICAL PROBLEM

It is desirable to impose a damage-free score in a refractory piece to sever same because the resultant severed edge is essentially in a pristine condition, having essentially maximum edge strength. Such damage-free scores are generally known as subsurface scores and/or pseudosubsurface scores. As taught in U.S. Pat. No. 3,979,243, a damage-free score may be initiated at a zone of damage on the surface of the refractory piece to be scored. Various techniques exist in the art for initiating a damage-free score. For example, U.S. Pat. No. 3,979,243 teaches that an initial force may be applied by the scoring wheel which is 20% greater than the selected scoring force to thereby damage the surface of the refractory piece to initiate the damage-free score. Also disclosed is a technique of impacting the surface of the piece with the scoring wheel to damage the surface and initiate the damage-free score. Such techniques, while useful, may be limited either because pressure controlling facilities are necessary or because impact controlling facilities are necessary. It will be appreciated that too great a pressure or too severe an impact might fracture the entire thickness of the refractory piece, while too slight a pressure or impact could fail to initiate the damage-free score with sufficient reliability.

U.S. Pat. No. 4,057,184 teaches that the surface of a refractory piece may be tapped with a rigid object, impacted with a scoring wheel, or have a scoring wheel rotatably urged against it to generate a zone of damage for the initiation of a damage-free score. Such techniques have been utilized on continuously moving glass ribbon, but may prove dissatisfactory because they may require the careful attention of personnel who are called upon to manually strike or rotate a scoring wheel which is biased to a rapidly moving substrate.

U.S. Pat. No. 4,213,550 teaches that a continually moving refractory piece may be scored by imposing surface damage thereon with a pointed stylis or conventional scoring wheel mounted in alignment with damage-free scoring facilities, whereby zones of surface damage pass downstream from the discrete surface damaging mechanism to the damage-free scoring facilities. Such a technique, when practiced with the impacting stylis, may be limited for the reasons discussed above, and in either embodiment, is limited by the need for discrete surface damaging mechanisms and for precise alignment between the surface damaging facilities and the damage-free scoring facilities.

There exists a need in the art for a method of initiating a damage-free score which avoids the limitations discussed above.

SUMMARY OF THE INVENTION

The present invention provides a method of imposing a damage-free score in a refractory piece which includes providing a particle of grit material between a scoring wheel and the surface of the refractory piece and providing a biasing force therebetween sufficient to damage the surface of the refractory piece. From the point of the surface damage, the scoring wheel and refractory piece are then moved relative to one another along a selected path of scoring while they continue to be biased toward one another with a biasing force sufficient to impose a damage-free score when the scoring wheel encounters zones of surface damage on the refractory piece. Thus, the entrapment of the particle of grit material between the scoring wheel and the refractory piece provides the zone of surface damage necessary for the successful imposition of the damage free score. Preferably, particles of grit material in a pattern are deposited on the surface of the refractory piece and a biased scoring wheel is caused to pass through the pattern of particles to initiate the score. Preferably, the selected particles of grit material are harder than the surface of the refractory piece and not as hard as the surface of the scoring wheel, to damage the refractory piece without damaging the scoring wheel.

In this manner, a damage free score may be reliably initiated without impacting the refractory piece, and the size of the zone of surface damage is minimized to about the size of a particle of the grit material.

DESCRIPTION OF THE FIGURES

FIG. 1 is a plan view of a glass ribbon conveyor system including scoring facilities incorporating features of the present invention.

FIG. 2 is an elevated side view of the conveyor system of FIG. 1.

DESCRIPTION OF THE INVENTION

Figure 3:
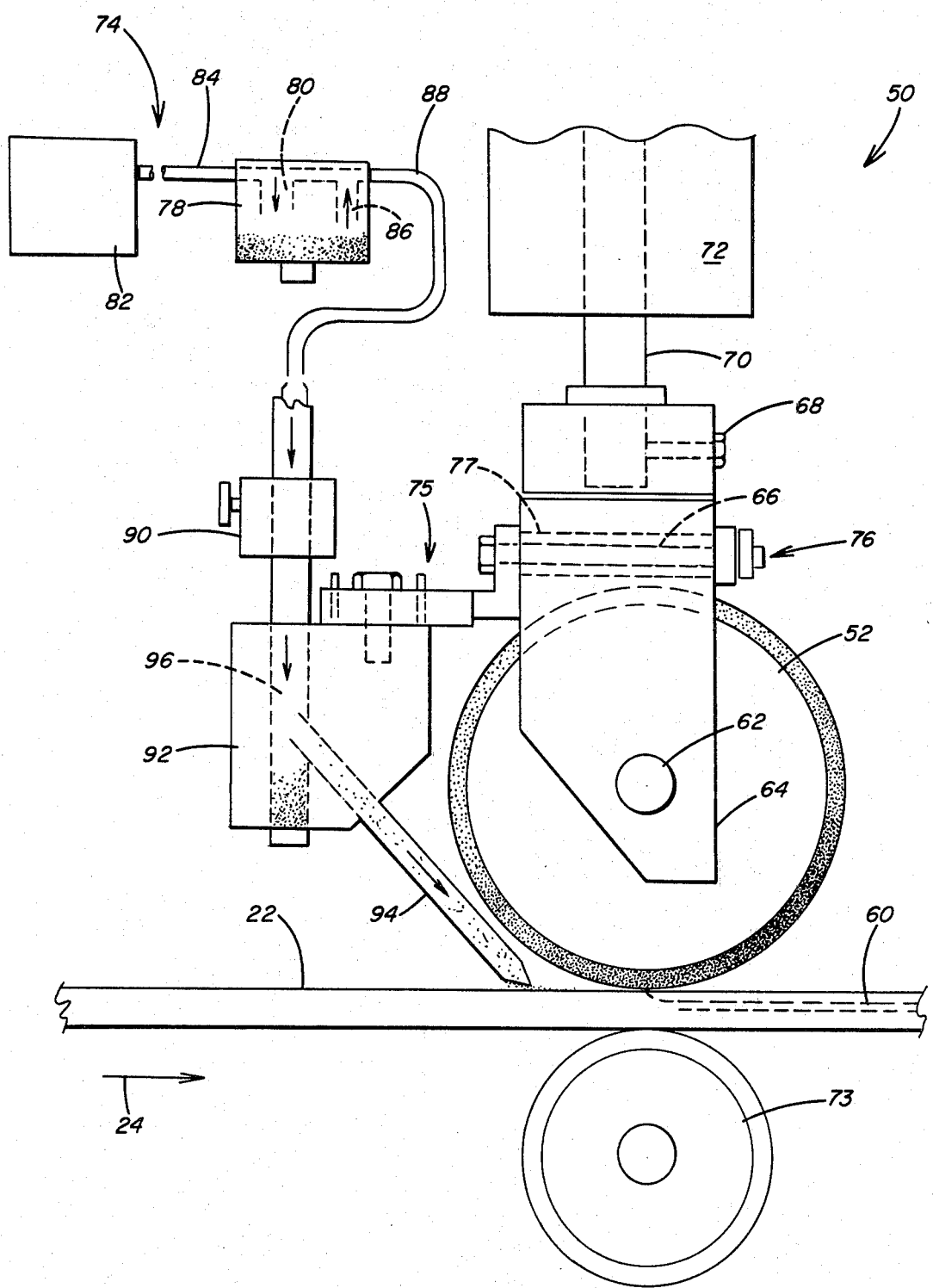
FIG. 3 is a view taken along line 3—3 of FIG. 1., having portions removed for purposes of clarity and showing damage free scoring facilities incorporating features of the present invention.

With reference to FIGS. 1 and 2, there is shown a glass ribbon conveyor system 20 of the type used in the art for advancing a glass piece, e.g., glass ribbon 22, in the direction of arrow 24 along a movement path through a ribbon scoring station 26 incorporating features of the present invention. The ribbon scoring station 26 includes a longitudinal scoring station 28 and a lateral scoring station 30.

The lateral scoring station 30 is not limiting to the present invention, and may be any of the type used in the art for imposing a conventional lateral score. The term "conventional score" as used herein is defined as a score or fracture extending from a major surface of the piece into the thickness of the piece. The term "damage-free score" is used generically herein to include subsurface scores and pseudosubsurface scores; where "subsurface score" is defined as an essentially spall or wing-free discontinuity or fissure that is within the thickness of the refractory piece and extends substantially perpendicular to the major surfaces thereof but does not extend to or connect either major surface of the piece; and where "pseudosubsurface score" is defined as a discontinuity or fissure in a piece of refractory material that extends substantially perpendicular to its major surfaces, that does not appear itself to extend to or connect either major surface, but which is accompanied by a microscopic zone of damage, essentially spall or wing-free, which extends between its tip and the major surface of the piece.

Generally, the lateral scoring station 30 includes a bridge 32 mounted above and transverse to the ribbon movement path 24. A scoring assembly 34 powered by motor 36 moves along the bridge 32, preferably at an oblique angle to the ribbon movement path 24 so that score lines 40 are generally perpendicular to the movement path 24. A bridge arrangement that may be used in the practice of the invention, although not limiting thereto, is taught in U.S. Pat. No. 3,244,337, which teachings are hereby incorporated by reference. The lateral scoring station 30 may be located either upstream or downstream of the longitudinal scoring station 28.

The longitudinal scoring station 28 generally includes a bridge 42 which spans the glass ribbon 22 and supports a plurality of scoring devices 44, 46, 48 and 50 of the type generally capable of propagating a damage-free score in the ribbon 22, e.g., those taught in U.S. Pat. Nos. 3,865,293; 3,865,673; 4,027,562; 4,057,184; 4,102,227; 4,137,803; and 4,213,550; which teachings are hereby incorporated by reference. Preferably each of the scoring devices 44, 46, 48 and 50 includes a scoring wheel 52 (shown in FIG. 2) of the type having an arcuate scoring surface which is sized and loaded during operation according to the teachings of U.S. Pat. No. 4,057,184. The scoring devices 44, 46, 48 and 50 are actuated in a manner to be discussed more fully below to generate longitudinal scores 54, 56, 58 and 60, respectively, in the glass ribbon 22. Preferably the position of scoring devices 44, 46, 48, and 50 is adjustable relative to the bridge 42 so that longitudinal scores 54, 56, 58, and 60 may be positioned in any desired location in the ribbon 22.

With reference to FIG. 3, there is shown the scoring device 50, which is intended to be exemplary of one embodiment of the scoring devices 44, 46, 48 and 50. The scoring device 50 generally includes the scoring wheel 52 rotatably mounted by axle assembly 62 to the bifurcated end 64 of a wheel holder 66. The opposite end of the wheel holder 66 is conveniently secured, e.g., by set screw 68, to the shaft 70 of an air cylinder 72, which serves to raise, lower and bias the scoring wheel 52 relative to the glass ribbon 22. The glass ribbon 22 may be supported directly below the position of the scoring wheel 52 by a support land 73.

In accordance with the practice of the present invention, a grit dispenser assembly 74 is conveniently mounted, e.g., by bracket 75, nut and bolt assembly 76, and a vertical slot 77, to the wheel holder 66 in a position upstream therefrom relative to the direction of advance of the ribbon 22. The grit dispenser 74 is thus vertically positionable for use with different diameter scoring wheels 52. Although not limiting to the invention, the grit dispenser 74 may include a reservoir of grit material 78 having an air inlet passage 80 which is connected to a source of pressurized air 82 through tube 84, and an outlet passage 86 which is connected by a tube 88 and a valve 90 to a dispenser block 92. An angularly mounted outlet pipe 94 has one end communicating with a conduit 96 within the dispenser block 92 and an opposite end extending to a point adjacent the lower edge of the periphery of the scoring wheel 52.

Although not limiting to the invention, to impose a damage free score 60 in the glass ribbon 22, the scoring wheel 52 may be biased against the surface thereof with a biasing force which is sufficient to propagate an already-initiated damage-free score but which is insufficient to initiate the damage-free score in the ribbon 22 absent interaction with an appropriate zone of surface damage. Thus, an undamaged ribbon 22 may pass unscored under the biased scoring wheel 52. When it is desired to initiate a damage free score 60, the valve 90 controlling the grit dispenser assembly 74 is activated. Pressurized air from the pressurized air source 82 is provided an open travel path and moves into grit material reservoir 78 through the air inlet passage 80, where it picks up particles of the grit material by a venturi effect and through turbulence. The particle-carrying pressurized air then passes through the outlet passage 86, tube 88, and valve 90 to the dispenser block 92.

According to the present invention, it has been determined that a damage-free score 60 may be initiated by the interaction of the biased scoring wheel 52 and a particle of the grit material which is entrapped between the scoring wheel 52 and the surface of the ribbon 22. Thus, while the grit dispenser assembly 74 might be utilized to blast the surface of the ribbon 22 with particles of grit material to damage same to initiate a damage free score, it is preferred that the particles of grit material be merely deposited upon the surface of the ribbon 22 upstream and in alignment with the scoring wheel 52. Accordingly, the pressure used in the dispenser assembly 74 need only be slightly above atmospheric, e.g., 2–10 ounces (56–280 grams), and the conduit 96 within the dispenser block 92 is bifurcated to dissipate any residual pressure therein such that the particles of grit material may simply drop due to the force of gravity through the outlet pipe 94 onto the surface of the ribbon 22 immediately upstream of the scoring wheel 52.

Although the exact mechanism of damage-free score initiation according the present invention may not be completely understood, it is believed that a particle of grit material which becomes entrapped between the biased scoring wheel 52 and the surface of the ribbon 22 serves to produce a small surface-damaged zone in the ribbon 22. This surface-damaged zone is then sufficient to allow the appropriately shaped and loaded scoring wheel 52 to drive a damage-free score 60 into the ribbon 22. Therefore, in the practice of the present invention, it is desirable to provide a pattern of particles of grit material upon the surface of the ribbon 22 which has a physical dimension and a particle density which assures reliable initiation of damage-free scores, i.e., to substantially assure that at least one particle of grit material becomes entrapped between the scoring wheel 52 and the ribbon 22. In practice a one inch (2.5 cm.) long pattern has generally proved sufficient for reliable damage-free score initiation, with a width which is sufficient to provide convenient alignment between the grit dispenser assembly 74 and the scoring wheel 52, e.g., 3/16 inch (0.95 cm.). The pattern of grit material preferably has a particle density of only a single particle thickness, i.e., single particles are generally spaced from neighboring particles upon the surface of the ribbon 22.

Grit materials which may be utilized in the practice of the invention are preferably sized between about #100 grit and about #500 grit and preferably are formed of particles having a hardness greater than the surface hardness of the ribbon 22 and less than the surface hardness of the scoring wheel 52. Although not limiting to the invention, useful grit materials include silicon carbide, aluminum oxide, chromic oxide, diamond, iron oxide, boron carbide, magnesium oxide, and tin oxide. Microscopic investigations revealed that use of some of these grit materials with carbide scoring wheels to impose damage-free scores was possible without generating any damage on the scoring surface of the scoring wheels. Similar microscopic investigation revealed that a mild steel scoring wheel suffered some damage to its scoring surface when utilized in the practice of the present invention with the silicon carbide and aluminum oxide grit materials. Thus, although not limiting to the invention, the grit material is preferably selected with sufficient hardness to damage the surface of the ribbon 22 while not damaging the scoring surface of the scoring wheel 52. Additionally, the grit material is preferably selected from materials which will not detrimentally affect subsequent ribbon treatment, or alternatively, and as shown in FIGS. 1 and 2, facilities 100, e.g., a vacuum device, may be provided to remove residual grit material from the ribbon 22 after it has passed downstream of the scoring wheel 52. A better understanding of the invention may be had by reference to the specific examples to follow.

EXAMPLE I

A 4 inch (10 cm.) diameter, 70° major radius, 0.015 inch (0.04 cm.) tip radius carbide scoring wheel 52 was biased to the surface of a ⅜ inch (0.95 cm.) thick glass ribbon with a load of 353 pounds (159 kilograms). A pattern of #120 grit silicon carbide particles was gravity-dropped onto the surface of the ribbon and the pattern was advanced under the biased scoring wheel. A damage-free score successfully initiated in the ribbon at a point within the pattern of grit material, a relatively small surface damage zone being detected at the point of damage-free score initiation.

EXAMPLE II

A ¾ inch (1.9 cm.) diameter, 150° major radius, 0.0035 inch (0.09 mm.) tip radius carbide scoring wheel was biased to the surface of a ⅜ inch (0.95 cm.) thick glass ribbon with a load of 20 pounds (9 kilograms). A pattern of #220 grit aluminum oxide particles was gravity-dropped onto the ribbon and advanced under the biased scoring wheel. A damage free score was initiated in the ribbon at a point within the pattern where a small zone of surface damage was generated by the passage of the scoring wheel.

EXAMPLE III

A scoring wheel of the type utilized in Example II was biased to the surface of a ⅛ inch (0.3 cm.) thick glass ribbon with a scoring wheel load of 20 pounds (9 kilograms). A pattern of #150 grit particles of a mixture of aluminum oxide and iron oxide was gravity-dropped onto the surface of the ribbon and the pattern was advanced under the biased scoring wheel. A damage free score was initiated at a point within the pattern where a small zone of surface damage was generated by the passage of the scoring wheel.

Of course, the present invention is not intended to be limited by the specific embodiments of the invention described herein, but rather by the claims which follow.

We claim:

1. A method of imposing a damage free score in a refractory piece, comprising the steps of:
    entrapping a particle of grit material between a scoring wheel and the surface of said refractory piece with an initial biasing force having a magnitude sufficient to damage the surface of said refractory piece thereby; and from the point of said surface damage,
    moving said scoring wheel and said refractory piece relative to one another along a selected path of scoring while biasing said scoring wheel and said refractory piece toward one another with a biasing force having a magnitude sufficient to impose a damage free score in said refractory piece upon encountering said surface damage.

2. The method as set forth in claim 1 wherein said particles of grit material are sized between at #100 grit and about #500 grit.

3. The method as set forth in claim 1 wherein said particles of grit material are selected from the group consisting of silicon carbide, aluminum oxide, chromic oxide, diamond, iron oxide, boron carbide, magnesium oxide, and tin oxide.

4. The method as set forth in claim 1 wherein said scoring wheel has a scoring surface with a surface hardness greater than the hardness of said particles of grit material.

5. The method as set forth in claim 1 further comprising the step of:
    removing said particles of grit material from the surface of said refractory piece after the initiation of said damage free score.

6. A method of initiating a damage free score in a refractory piece, comprising the steps of:
    depositing a plurality of particles of grit material upon an area of the surface of said refractory piece;
    biasing a scoring wheel toward the surface of said refractory piece with a biasing force having a magnitude sufficient to propagate a damage free score within said refractory piece upon encountering a zone of surface damage; and
    moving said plurality of particles and said scoring wheel relative to one another to pass said biased scoring wheel through said plurality of particles to damage the surface of said refractory piece and to initiate a damage free score within said refractory piece.

7. The method as set forth in claim 6 wherein said particles of grit material are sized between at #100 grit and about #500 grit.

8. The method as set forth in claim 6 wherein said particles of grit material are selected from the group consisting of silicon carbide, aluminum oxide, chromic oxide, diamond, iron oxide, boron carbide, magnesium oxide, and tin oxide.

9. The method as set forth in claim 6 wherein said refractory piece is an advancing ribbon of glass, and wherein said depositing step is practiced upstream of and in alignment with the location of said scoring wheel.

10. The method as set forth in claim 6 wherein said scoring wheel has a scoring surface with a surface hardness greater than the hardness of said particles of grit material.

11. The method as set forth in claim 6 further comprising the step of:
    removing said particles of grit material from the surface of said refractory piece after the initiation of said damage free score.

* * * * *